(12) United States Patent
Poloni et al.

(10) Patent No.: US 8,857,599 B2
(45) Date of Patent: *Oct. 14, 2014

(54) APPARATUS AND PROCESS FOR FORMING ROLLED BAR BUNDLES

(75) Inventors: Alfredo Poloni, Fogliano Redipuglia (IT); Giuseppe Bordignon, Bicinicco (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 4 days.

This patent is subject to a terminal disclaimer.

(21) Appl. No.: 13/261,516

(22) PCT Filed: May 13, 2011

(86) PCT No.: PCT/EP2011/057784
§ 371 (c)(1),
(2), (4) Date: Nov. 14, 2012

(87) PCT Pub. No.: WO2011/141570
PCT Pub. Date: Nov. 17, 2011

(65) Prior Publication Data
US 2013/0062162 A1    Mar. 14, 2013

(30) Foreign Application Priority Data

May 14, 2010    (IT) .............................. MI2010A0864

(51) Int. Cl.
*B21C 49/00* (2006.01)
*B21F 3/02* (2006.01)
*B65G 57/18* (2006.01)

(52) U.S. Cl.
CPC ................ *B65G 57/186* (2013.01); *B21F 3/02* (2013.01)

USPC ..................... 198/418.6; 198/560; 414/745.9; 414/746.4; 414/791.6; 53/536; 53/444

(58) Field of Classification Search
USPC .............. 198/418.6, 418, 431, 432, 433, 530, 198/532, 550.4, 560; 414/745.9, 746.1, 414/746.2, 746.4, 791.6; 53/536, 444
See application file for complete search history.

(56) References Cited

U.S. PATENT DOCUMENTS

| | | | |
|---|---|---|---|
| 3,718,062 A | | 2/1973 | Gilvar |
| 4,147,258 A | | 4/1979 | Kaplan |
| 4,174,662 A | | 11/1979 | Klusmier |
| 4,439,099 A | | 3/1984 | Asari et al. |
| 4,820,101 A | * | 4/1989 | Fenn .............................. 414/21 |
| 5,222,859 A | * | 6/1993 | Gepfert et al. ............. 414/794.3 |
| 5,956,928 A | * | 9/1999 | Bordignon et al. ............. 53/444 |
| 6,752,073 B1 | * | 6/2004 | Paris ............................ 100/212 |

* cited by examiner

*Primary Examiner* — Mark A Deuble
(74) *Attorney, Agent, or Firm* — Stetina Brunda Garred & Brucker (57) ABSTRACT

An apparatus for forming a bundle (11) of rolled bars, comprising bar conveying means (4), an inclined plane device (1) for forming a layer of bars and bar accumulation means (5), wherein the inclined plane device (1) comprises a plurality of support elements (2), arranged parallel to each another and defining a first plane inclined by an angle (a) with respect to a horizontal direction, and adapted to receive a predetermined number of bars defining the layer of bars on said first plane from said bar conveying means (4), handling means (60) for translating the inclined plane device (1) from a first maximum advancement position distal from the conveyor means (4) to a second maximum retraction position proximal to the conveyor means (4) to unload the layer of bars onto the accumulation means (5), at a speed such to prevent the bars resting on said supporting elements from being dragged.

16 Claims, 6 Drawing Sheets

APPARATUS AND PROCESS FOR FORMING ROLLED BAR BUNDLES

FIELD OF THE INVENTION

The present invention relates to an apparatus for forming bundles of long metal products, in particular round section bars, and to the process thereof.

STATE OF THE ART

Machines for forming bar bundles downstream of the cooling zone arranged at the exit of a rolling train are known; in such machines, the bars are fed by means of continuous conveyors first onto lance means and then, from the lance means themselves, are left to fall in bulk from a considerable height (30-50 cm) into the accumulation means underneath. In this manner, untidy, uncontrolled movements of the bars are determined, causing twisting and/or overlapping of the same, bringing to untidy bundles, which are not very compact and appear of low quality. A bar bundle of this type slows down downstream machining operations, e.g. processes which contemplate making electrically welded metal nets or brackets. Indeed, bundle unraveling operations are often needed to extract the bars and straightening operations are needed to eliminate bending and twist of the severely deformed bars.

A disadvantage of the known bar bundle forming devices is the delays contemplated in the bundle forming cycle. Interruptions of the feeding of the rolled bars onto the deposit lances are contemplated in order to complete evacuation of the previously formed bundle.

A further disadvantage of some known devices is that the deposit lances, when retracting to let the bars fall into the accumulation seat underneath, produce sliding between the lances themselves and the bars, thus generating a rotation of the bars about their axes, which in turn increases the level of irregularity of the bars accumulated in the seat underneath.

It is thus felt the need to make a rolled bar bundle forming apparatus which allows to overcome the aforesaid drawbacks.

SUMMARY OF THE INVENTION

The main object of the present invention is to make a continuously fed rolled bar bundle forming apparatus in which the bars are perfectly and reciprocally aligned without twisting, tangling or overlapping either inside or outside the bundle, providing an excellently shaped, regular appearance to the same.

Another object of the invention is to provide a process for continuously forming rolled bar bundles by means of the aforesaid apparatus.

The present invention thus proposes to reach the objects indicated above by making an apparatus for forming a bundle of rolled bars adapted to cooperate with a conveyor of said bars, said apparatus comprising, in accordance with claim 1, bar conveying means, an inclined plane device for forming a layer of bars and bar accumulation means, wherein the inclined plane device comprises a plurality of support elements, arranged parallel to each another and defining a first plane inclined by an angle $\alpha$ with respect to a horizontal direction, and adapted to receive a predetermined number of bars defining the layer of bars on said first plane from said bar conveying means, handling means for translating the inclined plane device from a first maximum advancement position distal from the conveyor means to a second maximum retraction position proximal to the conveyor means to unload the layer of bars onto the accumulation means, at a speed such to prevent the bars resting on said supporting elements from being dragged and wherein the bar accumulation means comprise first containing elements to contain the layer of bars when the inclined plane device is in the first maximum advancement position and has an end close to said first containing elements.

A second aspect of the present invention contemplates a process for forming rolled bar bundles by using the aforesaid apparatus which, in accordance with claim 11, comprises the following steps:
 arranging the inclined plane device in the first maximum advancement position;
 unloading a predetermined number of bars onto the inclined plane device by the conveying means to form a tidy, compact single layer of bars;
 translating the inclined plane device in substantially horizontal direction from the first maximum advancement position to the second maximum retraction position at a speed comprised from 0.5 to 3 m/s, whereby the bars resting on said supporting elements are not dragged and said single layer of bars is unloaded onto accumulation means remaining tidy and compact,
 translating the inclined plane device in substantially horizontal direction from said second maximum retraction position to said first maximum advancement position.

Advantageously, the apparatus and the process of the invention allow to obtain compact, tidy finished bundles with a high filling coefficient because each bundle is formed by the tidy overlapping of plane layers of bars arranged side-by-side in a compact, tidy manner. This result is obtained by depositing on the inclined plane device, incorporated in the apparatus of the invention, a plurality of bars arranged in contact with one another, without forming overlapping or twisting, and subsequently laterally translating or retracting of the inclined plane device along a substantially horizontal direction at a sufficiently high speed to nearly instantaneously remove the support from all bars of the layer without disturbing the order of the layer itself. It is apparent to a person skilled in the art that the removal speed of the inclined plane device depends on various factors, such as the inertia of the bars and the friction between the device and the bars which rest thereon, as explained below.

By virtue of the combination of the chosen inclination of the inclined plane device and its lateral translation speed, with the retraction of the inclined plane device, each layer of bars sequentially formed is neither altered nor disturbed, and maintains itself tidy and compact as it falls into the mobile bag underneath, with the bars of the layer remaining in the same reciprocal arrangement they had when they rested on the inclined plane device. Each layer of bars thus maintains itself compact and tidy during the step of falling, also by virtue of the friction that the bars exert on one another in mutual contact along their length. Furthermore, in the instant in which the resting plane is removed, the bars are not subjected to any effect of rotation about own axis, because in fact there is no slipping or dragging between inclined plane device and bars themselves during the lateral translation of the inclined plane device in horizontal direction.

In other words, the high retraction speed of the inclined plane device allows the immediate detachment of all the bars of the layer from the resting surface of the inclined plane device itself.

A further advantage is that the apparatus is arranged so as to allow each layer of bars to fall from the inclined plane device onto the mobile bag underneath, from a lower height than the falling height contemplated in machines of the prior art, allowing to avoid rebounds of the bars onto the mobile bag which could compromise obtaining a tidy, compact bundle with a high filling coefficient.

Furthermore, by virtue of the aforesaid features, the invention allows to obtain the following advantages:

- the downtimes in the bundle forming cycle are cancelled out by simultaneously and uninterruptedly feeding the bars onto the inclined plane device and evacuating the previously formed bundle;
- the rectilinearity of the bars within each bundle is guaranteed;
- the tidy arrangement of the bars and their rectilinearity allow to speed up and simplify downstream machining processes, for example processes which contemplate making electrically welded metal nets or brackets, because the extraction of each single bar from the bundle is facilitated;
- the bundles maintain a geometrically regular shape also after the binding operation;
- the downtimes and costs related to the bundle unraveling operation and the bar straightening operation are completely cancelled.

The bundle forming apparatus and process, object of the present invention, are preferably applied downstream of the bar hot rolling train, regardless of the type of bar packaging system. Advantageously, apparatus and process are used for packing bundles of round section bars, either provided with ribs for use in reinforced concrete or smooth intended, for example, for drawing.

The dependent claims describe preferred embodiments of the invention.

BRIEF DESCRIPTION OF THE FIGURES

Further features and advantages of the present invention will become more apparent in light of the detailed description of a preferred, but not exclusive, embodiment, of a bar bundle forming apparatus illustrated by the way of non-limitative example, with reference to the accompanying drawings, in which.

DETAILED DESCRIPTION OF PREFERRED EMBODIMENTS OF THE INVENTION

Figure 1:
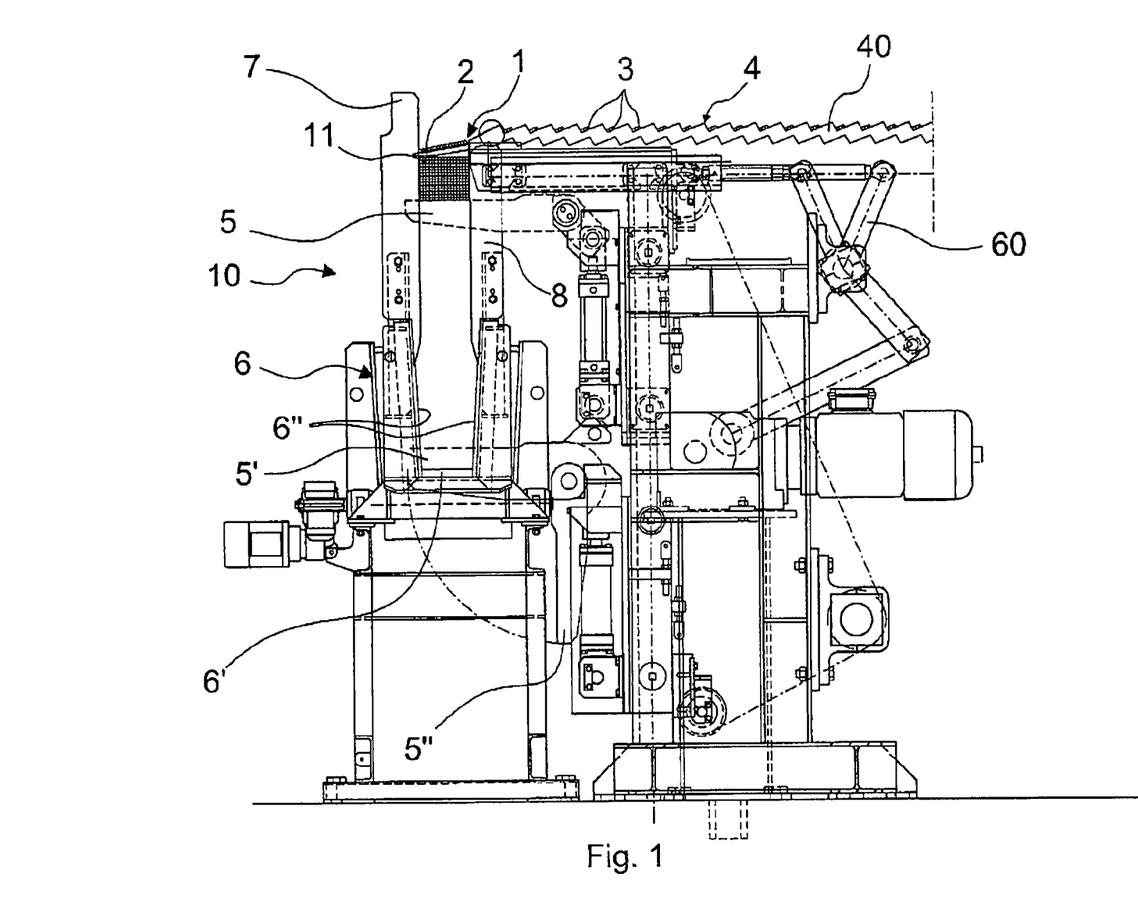
FIG. 1 is a side view of the apparatus according to the invention cooperating with a first variant of the bar conveyor.

Referring to FIG. 1, it is shown a side view of a part of a rolling plant for rolling metal bars of round, square, hexagonal section, either smooth or ribbed, comprising a bundle forming apparatus according to the present invention.

Such a bundle forming apparatus, indicated as a whole by reference numeral 10, cooperates with the end part of the handling and unloading area of the rolled bars 3 arranged downstream of a rolling train.

The apparatus comprises an inclined plane device 1 for forming a layer of bars which collects the bars 3 which are fed by the terminal end of the bar conveyor 4 and subsequently unloads them onto a mobile bag 5 underneath. The inclined plane device 1 for forming a layer of bars comprises straight, elongated supporting structural elements, such as for example rods, lances or beams, which are aligned and define the inclined plane of the device on which the bar layers are formed in sequence. These structural elements are arranged, in their maximum advancement position, with their longitudinal axis substantially orthogonal to the longitudinal axis of the bars in proximity of the terminal end of the conveyor. Viewed crosswise with respect to the rolling axis, the inclined plane device 1 is inclined with respect to the horizontal laying plane of the conveyor 4 by a small value angle $\alpha$.

Advantageously, the inclined plane device 1 is provided with an alternating advancement and retraction movement along a plane underneath, parallel to said horizontal laying plane, by means of specific mechanisms 60, e.g. of the connecting rod-crank type. Alternatively, other actuation mechanisms of hydraulic or pneumatic type may be contemplated (not shown).

Advantageously, each elongated supporting element 2 of the inclined plane device 1 has a substantially trapezoidal cross section with respect to its axis, with the smaller base arranged upwards in order to minimize the contact surface with the bar resting on top.

Figure 4:
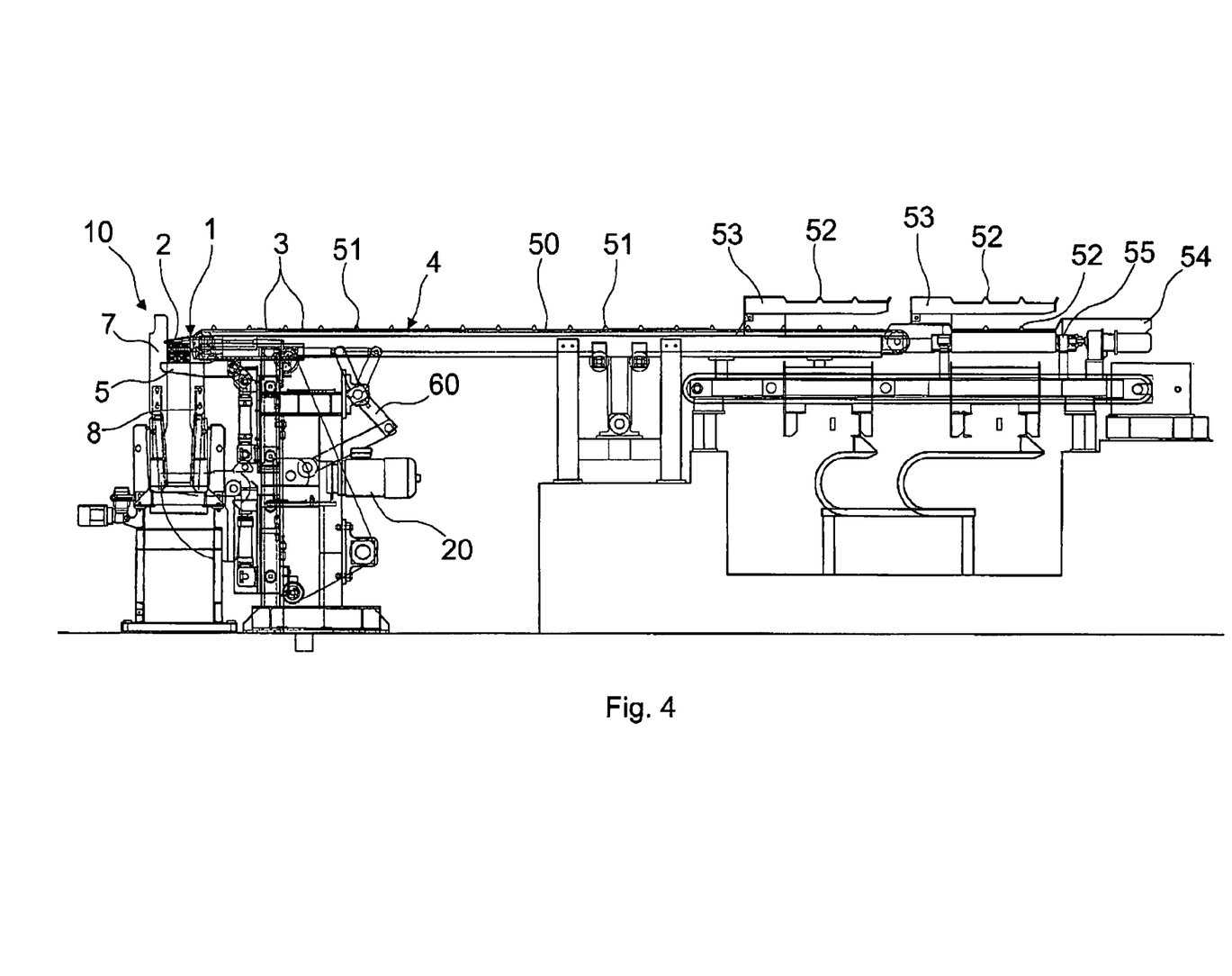
FIG. 4 is a side view of the apparatus according to the invention associated to a further variant of bar conveyor.

According to a side view parallel to the rolling axis (shown in FIG. 5), the elongated supporting elements 2 of the inclined plane device 1 are arranged alternating at a predetermined reciprocal distance so as to support the rolled bars 3 from the head to the tail along the entire longitudinal extension thereof. In particular, single elongated elements 2' are contemplated at the head and tail of the bars, while in the intermediate segments of the inclined plane device 1, the elongated elements are mounted in pairs 2" on a common frame 9. The actuating motors 20 of the aforesaid actuation mechanisms are shown in FIG. 4.

Figure 5:
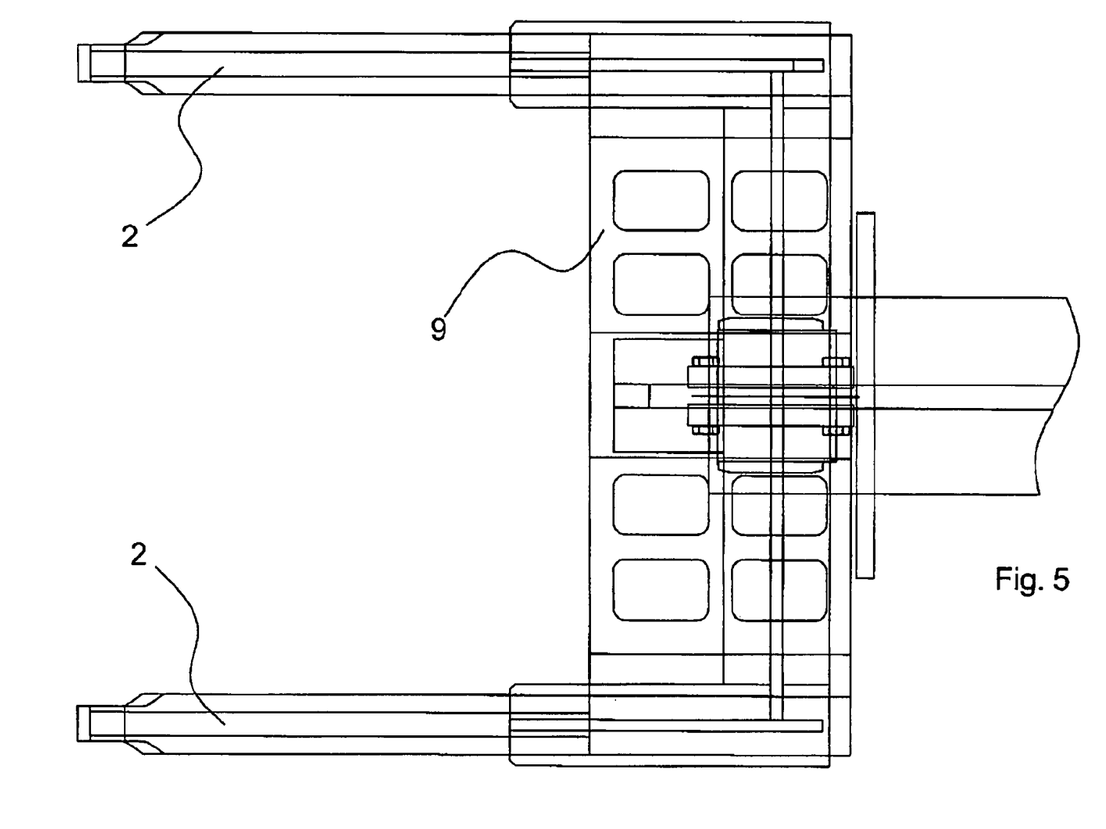
FIG. 5 is a top view of a module belonging to the apparatus of the invention.
Figure 6:
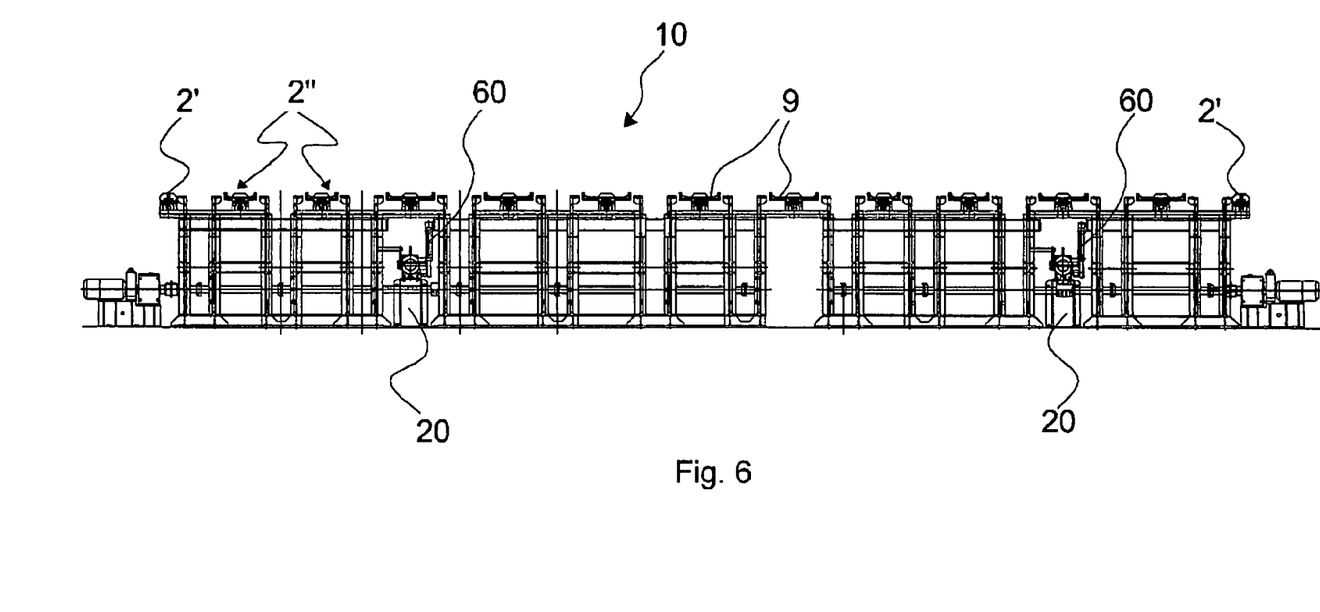
FIG. 6 is a side view, taken along a plane parallel to the rolling axis, of the bundle forming apparatus according to the present invention.

FIG. 5 shows a top view of a pair of elongated elements 2 mounted on the common frame 9.

Advantageously, said predetermined distance between the elongated elements of the same pair and between two consecutive elongated elements of two adjacent pairs is not very high, preferably variable from 0.5 to 1 m.

Indeed, because the residual temperature of the bar is still rather high (variable from between approximately 200° C. and approximately 650° C.), longitudinal deformations of the bar are generated with the formation of one or more loops between the resting points, i.e. between the elongated elements 2, which may deteriorate the rectilinearity of the bars. In addition to the residual temperature of the unloaded bar, the deflection value of the bar segment comprised between two rests also depends on the diameter of the bar and the distance between the two rests, and as a consequence the value of such deflection can be maintained as low as possible by choosing the aforesaid predetermined distance between the elongated elements 2 so the bar is more rectilinear while forming the bundle 11 to the benefit of the final quality of the bundle itself.

Advantageously, the inclination angle $\alpha$ of the laying plane of the inclined plane device 1 with respect to the horizontal laying plane of the conveyor 4 is chosen so as to guarantee complete, uniform descent of the bars and avoid tangling of the bars during the step of unloading from the conveyor onto the inclined plane device 1.

Advantageously, said angle $\alpha$ is comprised between approximately 1° and 30°, preferably equal to 10°-20°, value at which the best results were obtained.

The mobile bag 5, provided in a starting position just underneath the inclined plane device 1, comprises a plurality of horizontal resting surfaces spaced one from each other, each resting surface being preferably at a corresponding elongated element 2 of the inclined plane device 1. The bag 5 cooperates with a first vertical upright 7 and with a second vertical upright 8, opposite to the first, substantially positioned underneath the terminal end of the conveyor 4. The two uprights or locators 7, 8, both fixed, contain the layers being formed on the bag, preventing undesired transversal movements of the bars, and also contain the finished bar bundle 11 during the transfer of the bars from the bag 5 to the roller table 6 underneath.

The roller table 6 consists of motorized horizontal rollers 6' and of idle vertical rollers 6"; the resting surfaces of the bag 5, passing in the gap between the horizontal motorized rollers 6', rest bundle 11 on said rollers 6'. After having received the bar bundle 11, the motorized rollers 6' evacuate it sending it to the binding area of the bar packaging apparatus. Further roller tables for transferring the bound bundles, a weighing station and collection and accumulation bags of the bound bundles may be contemplated downstream of the binding area.

A forming cycle of a bar bundle contemplates, according to the invention, steps of depositing a single layer of bars on the inclined plane device 1 spaced one from each other by steps of unloading and accumulating of each single layer of bars on the mobile bag 5 underneath. Said mobile bag 5 is arranged immediately underneath the inclined plane device 1, in said starting position, and receives a layer of bars 3 cyclically released by the inclined plane device 1 itself: the bar bundle 11 is formed on the mobile bag, by subsequently superimposing layers, and is constituted by bars arranged perfectly side-by-side and reciprocally adjacent.

Advantageously, the falling height of the bars 3 from the inclined plane device 1 to the bag 5 is very low; indeed, a small difference of level prevents the bars from bouncing while landing, and thus prevents the risk of tangling and overlapping of the bars themselves.

More in particular, the preferred average falling or unloading height of the bars from the inclined plane device 1 to the bag 5 is comprised between 2 and 10 cm, preferably between 3 and 5 cm.

After one layer of bars has been unloaded from the inclined plane device 1 to the mobile bag 5, this is lowered by a fixed distance equal to at least the thickness-diameter of the bars, so as to always allow the free movement of the inclined plane device 1; such a lowering is carried out gradually to reach the required number of layers in relation to the required final dimension of the bundle to be formed. In all cases, the falling height of the bars on the accumulated layers underneath is substantially the same.

Once completed the forming of the bundle 11, the mobile bag 5 moves down at the roller table 6 underneath (position 5' in FIG. 1), deposits the bundle 11 on the motorized horizontal rollers 6' and rises up to the initial position immediately under the inclined plane device 1. Advantageously, the mobile bag 5 is turned by 90° downwards to a substantially vertical position 5" (FIG. 1) immediately after transferring the bundle 11 to the roller table: in this manner, the interference with the newly deposited bundle is prevented during the upward movement of the bag. The bag 5 may thus rise up without needing to wait for the bundle 11 itself to be evacuated. During the return stroke to the initial position, the bag is rotated and gradually returned to the horizontal position.

Figure 3:
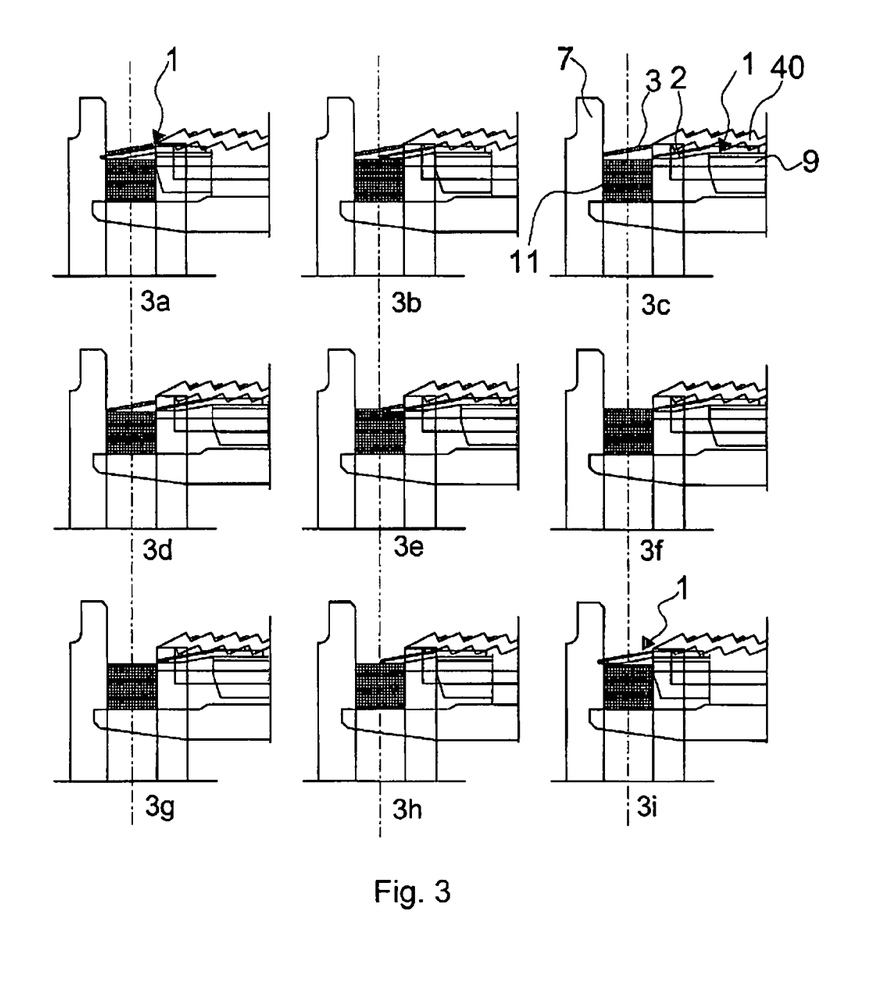
FIG. 3 is side view of some components of the apparatus according to the invention in some steps of the bar bundle forming process.

More in particular, with reference to FIG. 3 which shows the various steps of deposition of a layer of bars on the bundle 11, the inclined plane device 1 is in a first maximum advancement position (FIG. 3a), proximal to the first frontal locator 7, to receive the bars 3 which are unloaded by falling from the conveyor itself.

By virtue of the inclination of the end part of the inclined plane device 1, the bars 3 drop by gravity and roll along the upper surfaces of the lances themselves. The first bar unloaded onto the elongated elements 2 rolls until it stops at the first frontal locator 7, which has containment function; the subsequently unloaded bars will roll to be arranged side-by-side and form a first uniform layer on the lances. Advantageously, the inclined plane device 1 is arranged so that the front ends of the elongated elements 2, which cooperate with said first frontal locators 7 in the position of maximum advancement are at a lower height than the height of the respective rear ends (FIG. 3a).

Having formed the first layer of bars, the inclined plane device 1 is retracted very rapidly, by means of a lateral translation along a horizontal plane underneath the laying plane of the conveyor 4, to be arranged in a second maximum retraction position (FIGS. 3b and 3c), distal with respect to the first locator 7 and completely underneath the terminal end of the conveyor 4, in order to let this first layer of bars fall on the mobile bag 5 underneath, with the effect shown in FIGS. 3d, 3e, 3f.

The following figures show the reverse repositioning movement of the inclined plane device 1 from the position in which it was (FIG. 3g) to the reception position (FIG. 3i) of the bars, passing through an intermediate position, shown in FIG. 3h.

In this description, the terms "front end" indicate the end of the inclined plane device 1 which protrudes first from the zone covered by the conveyor 4 in the movement of the elongated elements 2 themselves from said maximum retraction position (FIG. 3g) to said maximum advancement position (FIG. 3i).

According to a first aspect of the bundle forming process of the invention, the retraction speed of the inclined plane device 1 is advantageously comprised from 0.5 to 3 m/s, preferably from 1 to 2.5 m/s, and is such that the resting surface is nearly instantaneously removed from the tidy, compact bar layer resting on the inclined plane device 1. This retraction speed, combined with the predetermined downward inclination of the inclined plane, avoids slipping and thus possible draggings, because the generation of friction at the contact surfaces between bars and inclined plane device is avoided. Tangling and overlapping of the bars both on the device 1 and on the respective layers of previously accumulated bars underneath are avoided during the step of unloading from the inclined surface device 1 because the bars fall at the same time maintaining themselves parallel to one another and once landed on the mobile bag 5 substantially have the same reciprocal position that they initially had on the inclined plane device 1.

Advantageously, the time interval needed for the inclined plane device 1 to go from the maximum advancement position to the maximum retraction position and then back to the maximum advancement position is shorter than the frequency at which the conveyor 4 feeds the bars 3 so that it is possible to continuously deposit the bars on the inclined plane device 1 without waiting downtimes or interruptions related to the step of unloading the bars previously deposited on the inclined plane device 1.

This unloading procedure of the inclined plane device 1 substantially prevents all lateral movements, tangling or twisting of the bars, which are thus tidily unloaded onto the mobile bag forming bundles of tidy, reciprocally superimposed layers of bars. The mobile bag 5, by cooperating with the vertical locators 7, 8, is lowered to pass with its resting surfaces in the gap between the motorized rollers 6' and rest the formed bar bundle 11 on said rollers 6'. At this point, the motorized horizontal rollers 6' transport the bar bundle 11 to the binding area. Advantageously, the vertical idle rollers 6" contain the bundle 11 inside the final descent segment of the bag.

In accordance with a second aspect of the process of the invention, the time employed by the mobile bag 5 to move down and rest the bar bundle 11, once completed, on the roller table 6 and return to the starting position for forming a new bundle is shorter than the cycle time in which the inclined plane device 1 is filled with a new layer of bars. Therefore, the bar bundle is transferred from the mobile bag 5 to the roller table 6 without ever needing to interrupt the feeding of the bars by the conveyor 4.

In accordance with a further aspect of the process of the invention, the conveyor 4 which feeds the bars 3 to the inclined plane device 1 is suitable for advantageously maintaining a predetermined distance between the actuated or moved bars and may consist, for example, of either a worm screw transfer device (not shown in the figures), or of a cooling plate 40 with fixed and mobile tooth racks (as shown in the variants in FIGS. 1 and 2), or of a combination of said devices (not shown). The fact of maintaining the bars physically separated before unloading them onto the inclined plane device 1 contributes to forming precise, tidy layers on the lances, without undesired tangling. Said conveyor may also feed the bars 3 to the inclined plane device 1 in twos or even more preferably in threes (FIG. 1), advantageously maintaining a predetermined distance between the pairs or triads of actuated bar.

The use of the cooling plate 40 has the further advantage of allowing to lower the temperature of the bars, thus increasing the stiffness thereof before unloading, with the advantage of rectilinearity.

Figure 2:
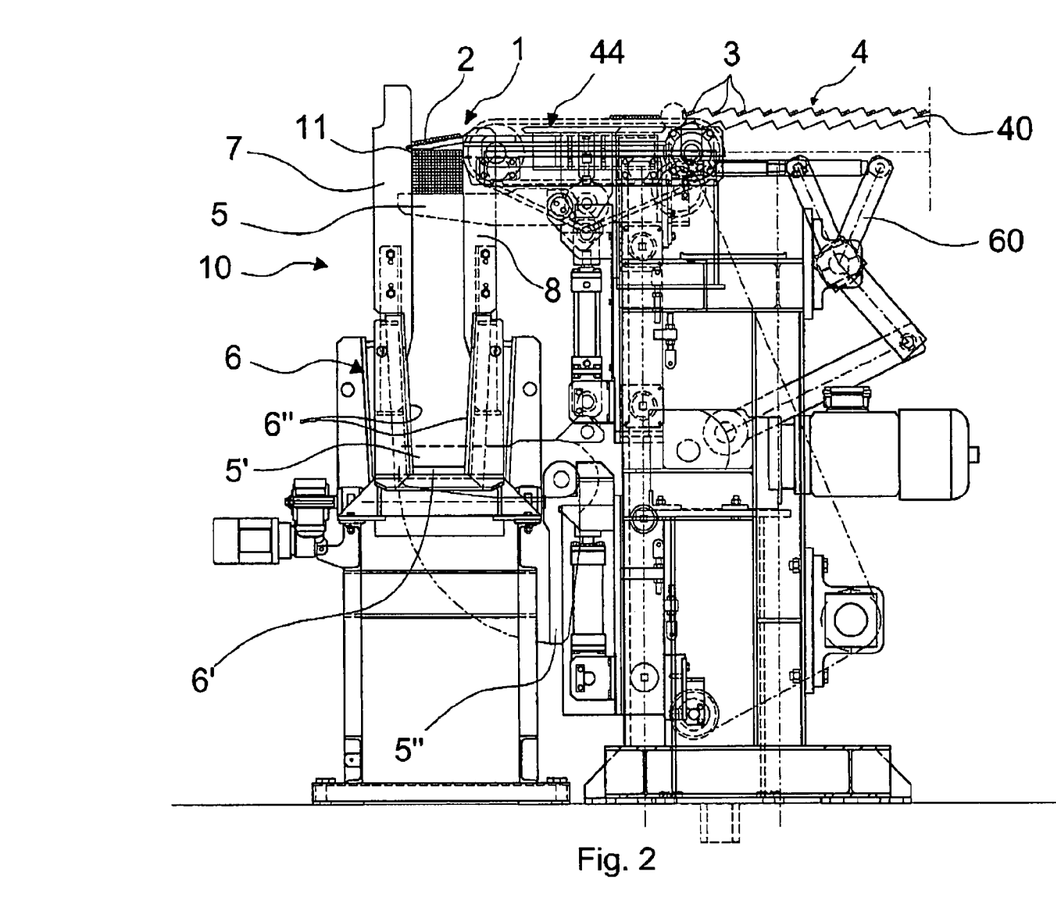
FIG. 2 is a side view of the apparatus according to the invention cooperating with a second variant of the bar conveyor.

In the variant of the apparatus of the invention, shown in FIG. 2, there is provided the use of an intermediate transfer device 44 arranged between the inclined plane device 1 and the cooling plate 40 with fixed and mobile tooth racks. This intermediate transfer device 44, made for example in form of a conveyor belt, is contemplated if the time interval, needed for the inclined plane device 1 to pass from the maximum advancement position to the minimum retraction position and then again to the maximum advancement movement, is longer than the frequency at which the cooling plate 40 advances the bars 3. The function of said intermediate transfer device 44 is thus that of a buffer-plenum chamber, so that the bars can be continuously deposited on the inclined plane device 1 without waiting downtimes or interruptions related to the step of unloading of the bars previously deposited on the inclined plane device 1.

In the variant of the apparatus for forming bar bundles in FIG. 4 there is provided the use of a conveyor 4 comprising a transport chain 50 which incorporates partition walls 51 in the part where the conveyor chain 50 makes the return stroke after unloading the layer of bars 3 into the mobile bag 5, maintaining the layers divided from one another. A shaped cover 54 with two partition stops may be provided along the roller table 55 to split the bars into groups of layers (e.g. three) of equal width. The bar conveyor 4 further comprises a bar layer actuation carriage 53 to transfer them from the roller table 55 to the conveyor chain 50. The carriage 53 is provided with partition walls 52 for moving the three layers of bars at the same time. The carriage 53 lifts, translates and deposits the layers without the bars coming from the rolling stands being subjected to jolts or shocks.

The invention claimed is:

1. An apparatus for forming a bundle of rolled bars, comprising bar conveying means, an inclined plane device for forming a layer of bars and bar accumulation means,
    wherein the inclined plane device comprises
    a plurality of support elements, arranged parallel to each another and defining a first plane inclined by an angle with respect to a horizontal direction, and adapted to receive a predetermined number of bars defining the layer of bars on said first plane from said bar conveying means,
    handling means for translating the inclined plane device from a first maximum advancement position distal from the conveyor means to a second maximum retraction position proximal to the conveyor means to unload the layer of bars onto the accumulation means, at a speed such to prevent the bars resting on said supporting elements from being dragged,
    and wherein the bar accumulation means comprise first containing elements to contain the layer of bars when the inclined plane device is in the first maximum advancement position and has an end close to said first containing elements.

2. An apparatus according to claim 1, wherein said predetermined angle is included between 1 and 20°.

3. An apparatus according to claim 1, wherein the accumulation means are arranged in a first position thereof at a distance under the inclined plane device, so that the average unloading height of the bars, between the inclined plane device and the accumulation means, is comprised between 3 and 5 cm.

4. An apparatus according to claim 1, wherein the accumulation means comprise a plurality of horizontal resting surfaces spaced one from each other, each resting surface being positioned at a respective supporting element.

5. An apparatus according to claim 3, wherein the accumulation means comprise second containing elements, arranged in position opposite the first containing elements, and are adapted to be handled from said first position to a lower second position thereof at a roller table.

6. An apparatus according to claim 5, wherein the roller table is composed of motorized horizontal rollers and vertical idle rollers, and the resting surfaces of the accumulation means are adapted to pass in a gap of the motorized rollers so as to rest the bundle on said motorized rollers.

7. An apparatus according to claim 1, wherein the layer of bars is arranged transversally to said supporting elements.

8. An apparatus according to claim 1, wherein the bar conveying means comprise a cooling plate with fixed and movable tooth racks.

9. An apparatus according to claim 8, wherein the bar conveying means comprise an intermediate conveying belt arranged between the cooling plate and the inclined plane device.

10. An apparatus according to claim 1, wherein the bar conveying means comprise a conveying chain provided with partition walls.

11. A process for forming rolled bar bundles, by means of an apparatus according to claim 1, comprising the following steps:
    arranging the inclined plane device in the first maximum advancement position;
    unloading a predetermined number of bars onto the inclined plane device by the conveying means to form a tidy, compact single layer of bars;
    translating the inclined plane device in substantially horizontal direction from the first maximum advancement position to the second maximum retraction position at a speed comprised from 0.5 to 3 m/s, whereby the bars resting on said supporting elements are not dragged and said single layer of bar is unloaded onto accumulation means maintaining themselves tidy and compact, translating the inclined plane device in substantially horizontal direction from said second maximum retraction position to said first maximum advancement position.

12. A process according to claim 11, wherein the bars are fed onto said first plane at least one at a time by means of the conveyor means at a first predetermined interval of time between the feeding of at least one bar and the feeding of at least one next bar.

13. A process according to claim 12, wherein the translation from said second maximum retraction position to said first maximum advancement position occurs in a second interval of time shorter than said first interval of time.

14. A process according to claim 13, wherein each time that a layer of bars is unloaded from the inclined plane device onto the accumulation means, the latter are progressively lowered by a distance equal at least to the thickness or diameter of one bar.

15. A process according to claim 14, wherein the accumulation means are lowered at a roller table underneath and deposit the bundle thereon after completing the formation of the bundle.

16. A process according to claim 15, wherein after depositing the bundle on the roller table, the accumulation means are turned downwards to prevent the interference with the newly deposited bundle during the step of moving upwards.

* * * * *